A. J. GIFFORD.
ELECTRICAL SWITCH.
APPLICATION FILED MAR. 5, 1909.
1,029,676.
Patented June 18, 1912.
3 SHEETS—SHEET 2.
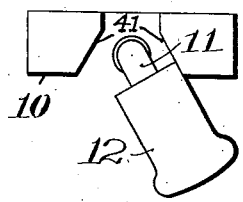
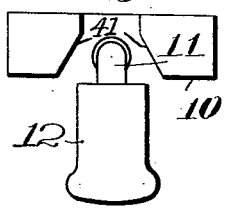
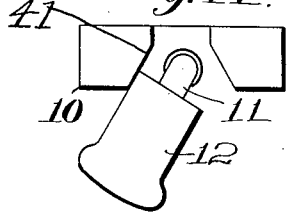
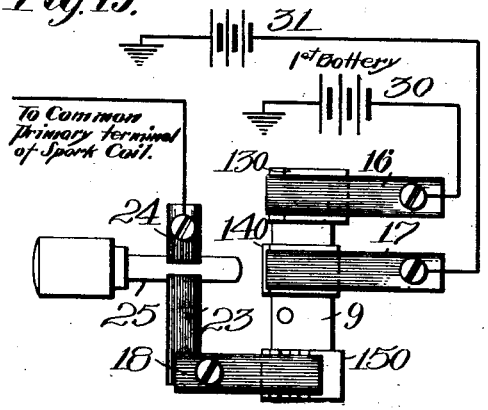
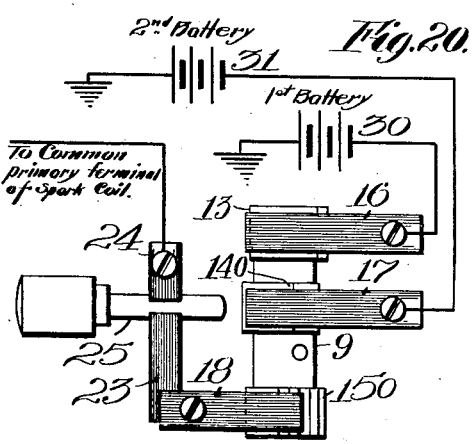
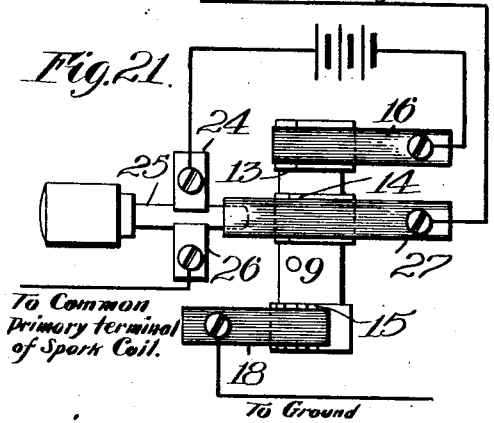
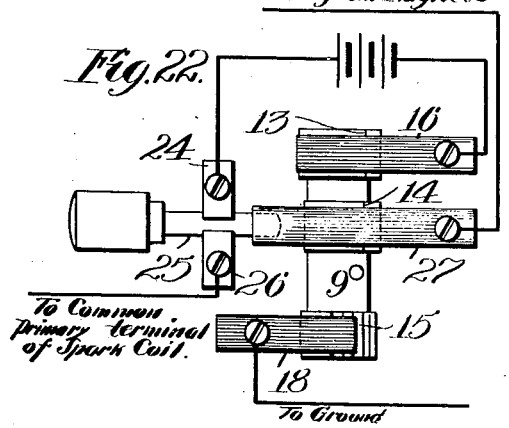

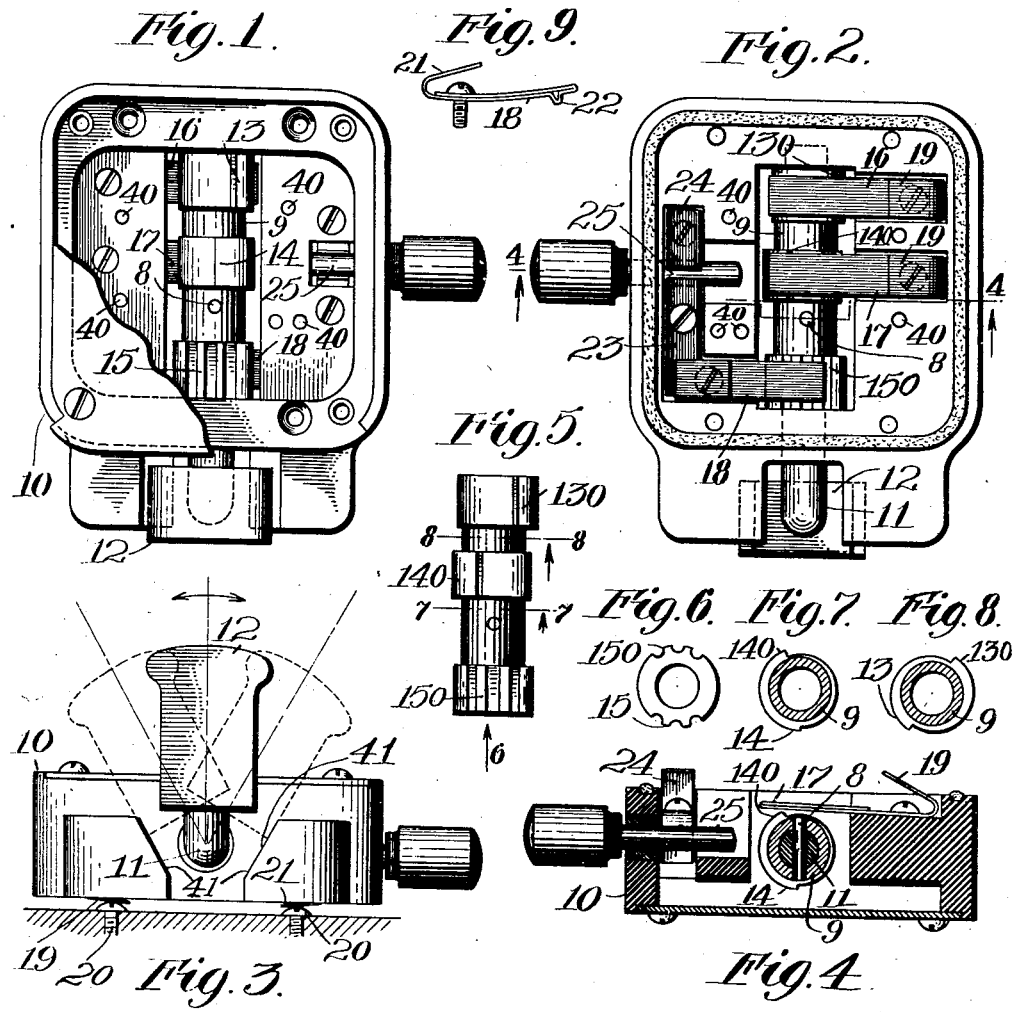

A. J. GIFFORD.
ELECTRICAL SWITCH.
APPLICATION FILED MAR. 5, 1909.
1,029,676.
Patented June 18, 1912.
3 SHEETS—SHEET 3.
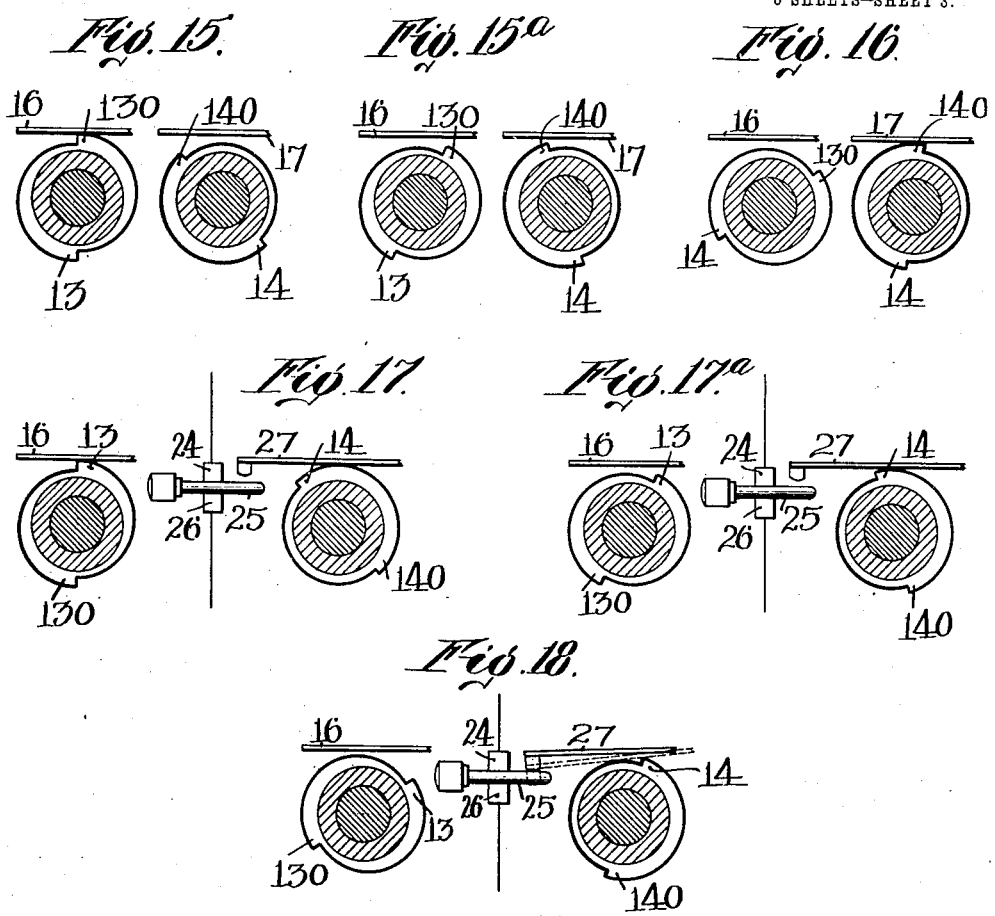
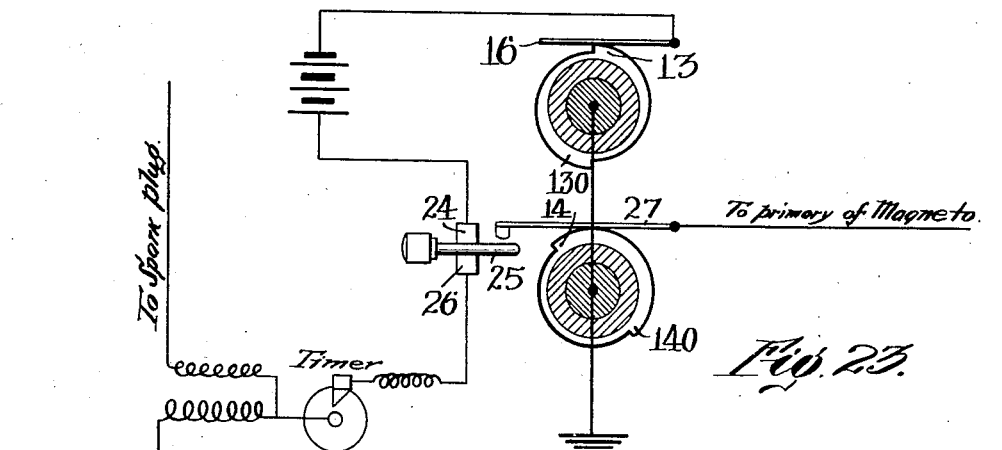

UNITED STATES PATENT OFFICE.

ALBERT J. GIFFORD, OF WORCESTER, MASSACHUSETTS, ASSIGNOR TO W. H. LELAND & COMPANY, OF WORCESTER, MASSACHUSETTS, A FIRM.

ELECTRICAL SWITCH.

1,029,676. Specification of Letters Patent. Patented June 18, 1912.

Application filed March 5, 1909. Serial No. 481,466.

*To all whom it may concern:*

Be it known that I, ALBERT J. GIFFORD, a citizen of the United States, residing at Worcester, in the county of Worcester and State of Massachusetts, have invented a new and useful Electrical Switch, of which the following is a specification.

This invention relates to a switch capable of connecting two batteries or other sources of power with an instrument to be operated by the same, such for example as in cases where a spark coil is to be operated sometimes by a battery and sometimes by high or low tension magneto or by two different batteries.

The principal objects of the invention are to provide a simple and inexpensive construction having few parts, and preferably only two moving parts, which can be used efficiently for connecting either a battery or high tension magneto with a spark coil and which by a very simple change can be converted into a switch for two batteries or for a battery and low tension magneto or for equivalent purposes; to provide a switch capable of general use for connecting an instrument with two sources of power and one capable of being changed in a very simple manner so as to be used for two different purposes; and to provide improvements in certain details of electrical switches.

Further objects and advantages of the invention will appear hereinafter.

Reference is to be had to the accompanying drawings in which—

Figure 1 is a front elevation of a switch embodying this invention broken away to show interior construction. Fig. 2 is a rear elevation of the same. Fig. 3 is a bottom plan view thereof. Fig. 4 is a sectional view on the line 4—4 of Fig 2. Fig. 5 is a front view of the oscillatable contacting member which is turned to operate the switch. Fig. 6 is an end view of the same. Figs. 7 and 8 are sectional views on the lines 7—7 and 8—8 respectively of Fig. 5. Fig 9 is a side view of one of the clips employed. Fig. 10 is a rear elevation similar to Fig. 2 showing the devices connected up in a different manner for use for another purpose. Fig. 11 is a side view of the clip which is used in Fig. 10. Figs. 12, 13 and 14 are diagrammatic bottom plan views indicating different positions of the oscillating member and handle. Figs. 15, 15ª, 16, 17, 17ª and 18 are diagrammatic views showing how the contacts are made and showing the parts in several positions. Figs. 19 and 20 are diagrammatic rear views of the complete switch as connected up for two sets of batteries or a battery and low tension magneto. Figs. 21 and 22 are similar views showing the connections for the high tension magneto and battery, and Fig. 23 is a diagrammatic view with the parts in the position shown in Fig. 21.

The switch is shown as comprising a block or casing 10 formed of insulating material, as for example, hard rubber cut, formed, or molded into shape and providing a support for the remainder of the mechanism. Mounted to oscillate on an axis in an opening or passage in this block is a shaft 11 with which is connected a handle 12 projecting at the bottom from the device and serving to turn the shaft and to indicate the position in which it is located. Held on this shaft by a removable pin 8 is a sleeve 9 which constitutes a movable contacting member having the conducting surfaces shown in the form of cams 130 and 140 and a toothed segment 150 at the rear, and two cams 13 and 14 and a toothed segment 15 at the front. Secured on the casing or block are spring clips constituting contact members 16, 17 and 18. Each of the clips 16 and 17 is shown as consisting of a flat piece of sheet copper or brass doubled back at the end and secured to the block by means of a screw or the like and lying on a ledge and projecting over the movable member or sleeve 9. The end of each clip which projects over the sleeve preferably is doubled at the free end so that most of the flexure will take place near the screw which goes through it to hold it. It is also provided with a projecting integral end 19 which lies at an acute angle to the surface of the block and constitutes a contact for resiliently engaging a terminal 20 with which the electrical connection is to be made. This terminal is indicated as fastened on the wall of a spark coil box or casing and in the form of a metallic disk, screw, or the like mounted on the wall of the casing and in position to engage the resilient projection 19. This description applies to both clips 16 and 17.

The clip 18 is provided with a resilient projection 21 and it is shown as double at 110 its free end, the screw passing through the doubled over portion. It is also provided with a projection 22 extending downwardly from its lower strand for engaging the teeth 150 or 15 to hold the shaft in any one of its several positions. It will be seen that there are three of these teeth 15 on the front and three (150) on the rear of the sleeve corresponding with six positions thereof. It will be understood, of course, that the clip 16 is intended to contact with the cam 130 and the clip 17 with the cam 140. The other terminals in the form shown in Fig. 2 are a pair of clips 23 and 24. The clip 23, as the parts are arranged in Fig. 2, is in electrical contact with the clip 18 and it is separated from the clip 24 by a space in which is located a metal plug 25. This arrangement is for the connection of two batteries or a battery and low tension magneto with the spark coil.

In the form shown in Fig. 10 the parts 11, 16, 18, 24 and 25 are the same as above except that the sleeve 9 is turned the other side around or reversed on the shaft so as to bring the parts 130, 140 and 150 in front. In place of the clip 23 is a smaller clip 26 which is designed to connect with the clip 24 by the plug and is insulated from the clip 18 on account of being too short to reach it. In place of the clip 17 is a clip 27 which is very similar to the clip 17 but extends farther to the left and is provided with a non-conducting projection 28 with which the plug 25 is adapted to come into contact under certain conditions.

The operation of the device will be described with particular reference to the diagrammatic views of the second sheet, reference first being had to Figs. 12, 13, 14, 15, 16, 19 and 20 which correspond with Figs. 1, 2, 3 and 4 of Sheet 1. It will be seen that the clip 16 is shown as connected up with one set of batteries and the clip 17 with another. For one of these batteries may be substituted a low tension magneto. The clip 24 is connected to the common primary terminal of the spark coil. As above explained the clips 18 and 23 are connected with each other. Now when the handle 12 is in the position shown in Fig. 12 the cams 130 and 140 will be in the position shown in Fig. 15, these two cams being represented as side by side in this figure for convenience. In this case the cam 130 projects up into contact with the clip 16 so that the first battery 30 is connected through the clip 16 with the sleeve 9 then through the clip 18 with the clip 23 so that when the plug 25 is inserted there will be a through connection through the plug and clip 24 to the common primary terminal of the spark coil back through the primary and commutator to the ground. At the same time the cam 140 is turned so that it is not in contact with its clip 17 and the battery 31 is thus thrown out of circuit. Now when the handle is turned to the neutral position shown in Fig. 13 the cams are brought to a position in which both of them are out of contact with their clips 16 and 17 and both of the batteries out of circuit as shown in Fig. 15ª. By bringing the handle around to the third position shown in Fig. 14 the cams are brought to the position shown in Fig. 16, the cam 130 being out of contact with its clip so that the battery 30 is disconnected, and the cam 140 being in contact with the clip 17 so that the battery 31 is connected. This connection is through the same path as described above, as shown in Fig. 20. It will be seen, therefore, that with this set of connections it is a very easy matter to change from one battery to the other or from the battery to the low tension magneto or vice versa or to a neutral position in which both batteries or battery and magneto are thrown out of circuit, and that in any position the removal of the plug will render all connections impossible.

When it is desired to use this switch for a high tension magneto and battery, only very simple changes are required. In the first place the clip 26 is substituted for the clip 23 so that it will be insulated from the clip 18. The clip 27 is substituted for the clip 17 and the sleeve 9 is given a half turn on the shaft. This set of connections is shown in Figs 10, 21, 22 and 23. In the position of the parts indicated in Fig. 17, it being remembered that the sleeve is now reversed, the handle will be in the position shown in Fig. 12 but in this position the cams 13 and 14 contact with the clips 16 and 27, respectively. The clip 16 is connected with the battery and the clip 27 with the magneto. Now in this position of the parts the current from the battery will come through the clip 16, sleeve 9, clip 18 to the ground through the commutator, back through the primary winding of the spark coil to the clip 26 with which the latter is connected and then, if the plug 25 is in, through the clip 24 which is now connected with the other terminal of the battery as indicated in Fig. 21. The connection from the high tension magneto is through the clip 27, sleeve 9 and clip 18 to the ground. Therefore, with this state of affairs, as long as the handle is in the position shown in Fig. 12, the battery will be operative and the magneto inoperative because grounded when the plug is in. But as soon as the plug is withdrawn, this of course interrupts the battery circuit. By turning the handle to the neutral position Figs. 13 and 17ª the cam 13 will be brought out of contact with its clip and the cam 14 will remain in contact with the clip 27 and hold it out of reach of the plug, so that irrespective of the position of the plug 25 the magneto and battery are inoperative so that the machine can not be started by use of the plug alone. In the position indicated in Fig. 22 with the handle in the position shown in Fig. 14 the cam 13 is out of contact with its clip, but the cam 14 is in contact normally when the plug is out, as shown in dotted lines in Fig. 18, which renders both battery and magneto inoperative but when the plug 25 is in position it engages the insulating projection 28 of the clip 27 and holds the latter up as shown in full lines in Fig. 18 away from the cam 14 so as to prevent the magneto from being grounded and consequently hold it operative. It will be seen therefore, that means is provided whereby the connections can be made in two ways with very simple changes. At the same time the clips or terminals are of very simple and effective construction so that a mere clamping of the box or casing on the wall of the spark coil casing in proper position results in making the necessary connections, yet at the same time if it is desired to connect by means of wires, the casing is provided with perforations 40 through which the wires can pass and be connected under the clips where they are screwed to the insulating block or casing. The use of the insulating knob 28 is an improvement over those constructions in which metallic parts are employed for making and breaking contacts because there is less danger of short circuiting. It is to be observed that the casing 10 has a recess or passage bounded by slanting walls 41 in which the end of the handle 12 is located so that in its two extreme positions the handle comes against these walls, which receive the blow and thus take the strain off the shaft 11 and other connections. This is advantageous because this handle is generally operated by the foot and is liable to be thrown over quickly.

While I have illustrated and described a preferred embodiment of the invention and shown two applications thereof, I am aware that it can be applied to the other purposes for making electrical connections and that many modifications can be made in the construction and arrangement of the parts without departing from the scope of the invention as expressed in the claims. Therefore, I do not wish to be limited to all the details of construction shown and described, but What I do claim is:—

1. In an electrical switch, the combination of an insulating casing having a ledge thereon at a distance inside its surface, a plurality of metallic clips secured to said ledge and projecting inwardly from it in the same plane, said casing having an opening at the end of the ledge, an oscillatable member mounted on the casing in said opening and having eccentric surfaces at different points therealong adapted to engage said clips in certain positions of the oscillatable member, a handle on said member for turning it, and integral means on the casing for limiting the turning motion of said member to two positions in one of which one clip is in contact with one of said eccentric surfaces, and in the other another clip is in contact with another.

2. In an electrical switch, the combination of a movable member, two metallic clips projecting toward the movable member, said movable member having conducting surfaces thereon in such position that one of them will engage one of the clips when the movable member is moved to one position, and the other will engage the other clip when the movable member is moved to a second position, a third metallic clip constantly in engagement with the movable member in all positions thereof, another pair of clips on the casing separated from each other, and a movable conducting plug adapted to be inserted between said pair of clips.

3. In an electrical switch, the combination of a movable member adapted to turn on an axis, two metallic clips projecting toward the movable member, said movable member having conducting surfaces thereon in such position that one of them will engage one of the clips when the movable member is turned to one position, and the other will engage the other clip when the movable member is turned to a second position, a third metallic clip constantly in engagement with the movable member in all positions thereof, said third clip having means for yieldingly holding the movable member in each one of its positions after it is brought thereto, another pair of clips on the casing separated from each other, and a removable conducting plug adapted to be inserted between said pair of clips.

4. In an electrical switch, the combination of a movable member, two metallic clips, said movable member being adapted to be moved and having conducting surfaces thereon in such position that one of them will engage one of the clips when the movable member is moved to one position and the other will engage the other clip when the movable member is moved to a second position, a pair of metallic clips separated from each other, means for electrically connecting one of said pair of clips with one of the first named clips, and a conducting plug adapted to be inserted between said pair of clips to connect them.

5. In an electrical switch, the combination of a casing having an opening therein, a movable member located in said opening, two metallic clips secured to the casing and projecting into the opening, said movable member being adapted to be turned on an axis and having conducting surfaces thereon adapted to engage the clips when the movable member is turned to certain positions, a pair of metallic clips mounted on the casing and separated from each other, a conducting plug adapted to be inserted into the casing to connect said pair of clips, and means whereby when said plug is inserted into the casing to connect said pair of clips, and the movable member is in one position, the insertion of said plug will cause one of the first named clips to be moved positively out of contact with the movable member.

6. In an electrical switch, the combination of a contact clip, a movable conducting member adapted to engage the clip, a pair of contact clips, a contact plug for connecting said pair of contact clips, and means whereby when the movable member is in one position the insertion of the plug to connect said contact clips will cause the first mentioned clip to be moved out of engagement with the movable member.

7. The combination of two conducting clips, a movable conducting member having means for engaging one of said clips in certain positions thereof and the other in certain positions, a third clip connected with the conducting member, an additional pair of clips separated from each other, and a movable plug adapted to connect said pair or clips, the pair of clips and plug being disconnected from said movable conducting member.

8. The combination of two conducting clips, a movable conducting member having means for engaging said clips in certain positions thereof, a third clip connected with the conducting member, an additional pair of clips separated from each other, a movable plug adapted to connect with said pair of clips, and means whereby when the movable member is in one position the insertion of said plug will cause one of the clips to be moved away from said conducting member.

9. The combination with a movable member, of two metallic clips, said movable member being adapted to be moved to three positions and having two conducting surfaces thereon in such position that one of them will engage one of the clips when the movable member is moved to one position, and that both will engage their clips when the movable member is moved to a second position, electrical connections connected with the clips, and with said movable member, and removable means for moving one of said clips out of contact with the movable member, in one position thereof.

10. As an article of manufacture, an electrical contact clip formed of sheet metal doubled on itself at one end, the two portions being secured together at a distance from the end, and of a single thickness at its opposite end in the plane of the doubled portion, and having means whereby it can be held rigidly at its single end.

In testimony whereof I have hereunto set my hand, in the presence of two subscribing witnesses.

ALBERT J. GIFFORD.

Witnesses:
ALBERT E. FAY,
C. FORREST WESSON.